United States Patent [19]
Badin et al.

[11] 3,765,850
[45] Oct. 16, 1973

[54] HYDROCARBON FUEL COMPOSITIONS
[75] Inventors: Elmer J. Badin, Hightstown;
Paul M. Kerschner, Trenton;
Aldo Cresti, New Brunswick,
all of N.J.

[73] Assignee: Cities Service Oil Company,
Tulsa, Okla.

[22] Filed: Sept. 30, 1970
[21] Appl. No.: 77,041

[52] U.S. Cl.................. 44/66, 44/71, 44/DIG. 1,
252/392
[51] Int. Cl. ........................ C10l 1/18, C10l 1/22
[58] Field of Search................ 44/66, 71, DIG. 1;
252/8.55 E, 392; 260/404.5

[56] References Cited
UNITED STATES PATENTS
3,565,592   2/1971   Mehmedbasich ................. 44/71 X
3,623,851   11/1971  Konig et al. ....................... 44/66 X Primary Examiner—Daniel E. Wyman
Assistant Examiner—W. J. Shine
Attorney—Richard S. Strickler, Elton F. Gunn, Patricia J. Hogan, Burton E. Levin, Joshua J. Ward, Edwin T. Yates, George L. Rushton and A. Joe Reinert

[57] ABSTRACT

Carboxylic acid salts of polyamides having at least one amino group and hydrocarbon fuel compositions containing same. The salts are formed by neutralizing with a carboxylic acid at least 10 percent of the amino groups of a polyamide containing from about 2 to about 6 amide groups and at least one amino group. Hydrocarbon fuel compositions containing these salts exhibit desirable properties such as enhanced carburetor detergency and carburetor anti-icing characteristics, improved water tolerance, improved anti-corrosion properties, and cleaner engine operation.

5 Claims, No Drawings

HYDROCARBON FUEL COMPOSITIONS

BACKGROUND OF THE INVENTION

Normally liquid hydrocarbon fuels often require additives to improve their performance characteristics. Thus, in fuels such as gasoline, diesel fuel and jet fuel, various additives are employed to inhibit corrosion and to assist in maintaining cleanliness in the carburetor and fuel intake system and to prevent carburetor icing. The additives vary in effectiveness, and it is often necessary to use a number of additives in a single composition.

Many additives for hydrocarbon fuels are only marginally soluble in hydrocarbons. Furthermore, they are often employed in concentrations that approach their limits of solubility. As a result, hydrocarbon compositions containing such additives often exhibit poor stability and, as a result, the additive may precipitate on standing.

In addition, many additives for hydrocarbon fuels have poor water tolerance. When fuel compositions containing such additives come in contact with water as, for example, in storage tanks, water enters the hydrocarbon phase. This is particularly deleterious in jet fuels. The temperatures at high altitudes where jet aircraft operate are well below freezing. Hence, water in the fuel crystallizes and plugs fuel filters, thereby cutting off the flow of fuel to the engines. To combat this, fuel tank heaters and additives to prevent ice formation are employed.

SUMMARY OF THE INVENTION

It is an object of this invention to provide additives which, when incorporated in normally liquid hydrocarbon fuels, impart desirable properties thereto.

It is another object of this invention to provide additives which are readily soluble in normally liquid hydrocarbon fuels to produce stable compositions.

It is yet another object of this invention to provide normally liquid hydrocarbon fuel compositions having enhanced carburetor and fuel intake system detergency properties as well as superior carburetor anti-icing characteristics.

Another object of this invention is to provide normally liquid hydrocarbon fuel compositions having improved anti-corrosion properties.

It is still another object of this invention to provide normally liquid hydrocarbon fuel compositions having improved water tolerance properties.

Still other objects will appear hereinafter.

The foregoing objects are attained in accordance with this invention. In general, this invention comprises a carboxylic acid salt of a compound having the general formula

wherein $m$ is at least 1 and the sum of $n$ plus $m$ is from 2 to about 6, R is a multivalent hydrocarbon group of about two to about 52 carbons, R' is a hydrocarbylene group of about two to about 12 carbons, R'' is selected from the group consisting of hydrogen and hydrocarbyl groups of about one to about 30 carbons, R''' is a hydrocarbyl group of about two to about 12 carbons, and at least 10 percent of the amino groups are converted to the carboxylic acid salt; and normally liquid hydrocarbon fuel compositions comprising a major proportion of a normally liquid hydrocarbon fuel and a minor proportion of the above additive.

Normally liquid hydrocarbon fuel compositions containing the additive compounds of this invention exhibit such desirable properties as improved anti-corrosion properties and enhanced carburetor and fuel intake system detergency properties as well as superior carburetor anti-icing characteristics. In addition, hydrocarbon fuel compositions containing our additives have good water tolerance which favors dry fuel. Furthermore, the good solubility of the additives of this invention in liquid hydrocarbon fuels insures stability with little tendency toward precipitation. Another advantage of our additives is that their ability to impart desirable properties to liquid hydrocarbon fuels when used at low concentrations which makes them economically attractive. Other advantages of this invention will be apparent from the following description.

DESCRIPTION OF THE PREFERRED EMBODIMENTS

The normally liquid hydrcarbon compositions of this invention are prepared by incorporating into a major proportion of a normally liquid hydrocarbon fuel a minor proportion of an additive which is basically a carboxylic acid salt of a polyamide having at least one amino group. Examples of normally liquid hydrocarbon fuels that have desirable properties imparted thereto by the additives of this invention are gasoline, jet fuel and diesel fuel.

The novel additives of this invention are prepared by reacting a carboxylic acid with a polyamide containing from 2 to about 6 amide groups and at least one amino group whereby at least about 10 percent of the amino groups are converted to the carboxylic acid salt. The polyamides are prepared by condensing a polycarboxylic acid having from 2 to about 6 carboxyl groups with an amine or amines to convert each carboxyl group to the corresponding N-substituted amide group. It is critical that at least one N-substituted amide group in every molecular contain an amino group on the substituent. Thus at least one carboxyl group of the polycarboxylic acid must be condensed with a polyamine, preferably a diamine, while the remainder of the carboxylic groups may be condensed with either a monoamine or a polyamine. However, it is preferred that each carboxyl group be condensed with a diamine. The preferred acids are dicarboxylic acids. Hence the preferred polyamides are diaminodiamides having the general formula

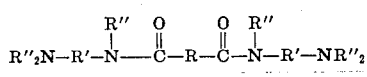

wherein R is a hydrocarbylene group of about two to about 52 carbons and preferably about four to about 34 carbons, R' is a hydrocarbylene group of about two to about 12 carbons and preferably about two to about six carbons, and R'' is selected from the group consisting of hydrogen and hydrocarbyl groups of about one to about 30 carbons and preferably about three to about 24 carbons.

The carboxylic acid which is reacted with the polyamide containing one or more amino groups to form the salt may contain from 1 to about 3 carboxyl groups and from about one to about 36 carbons and may be aliphatic, aromatic, or naphthenic or it may contain various mixtures of aliphatic, aromatic and naphthenic segments. Aliphatic and naphthenic segments may be either saturated or unsaturated. The carboxylic acid may also contain one or more hydroxyl or hydrocarbyloxy groups. The hydroxyl and hydrocarbyloxy groups may be on an aliphatic, naphthenic or aromatic segment of the carboxylic acid. The ratio of carboxylic acid to the polyamide containing one or more amino groups is such that at least about 10 percent of the amino groups are converted to the carboxylic acid salt. While about 10 percent to about 100 percent of the amino groups may be converted to the carboxylic acid salt, it is preferred that about 50 percent to about 90 percent of the amino groups be converted to the salt since the presence of some free amino groups is usually desirable.

As stated above, the polyamide containing from 2 to about 6 amide groups and at least one amino group has the general formula

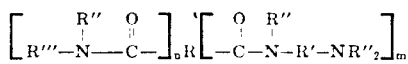

wherein R is a multivalent hydrocarbon group of about two to about 52, and preferably about four to about 34, carbons, and $m$ is at least one and the sum of $n$ plus $m$ is from two to about six. The polycarboxylic acid from which the polyamide is made therefore has the general formula

wherein R is a multivalent hydrocarbon group of about two to about 52 carbons and preferably about four to about 34 carbons. R may be aliphatic, aromatic or naphthenic, or it may contain various mixtures of aliphatic, aromatic and naphthenic segments. Aliphatic and naphthenic segments may be either saturated or unsaturated. While the sum of $m$ plus $n$ may be from 2 to about 6, it is preferred that the sum of $m$ plus $n$ be 2, i.e., a dicarboxylic acid. Examples of suitable polycarboxylic acids are succinic acid, glutaric acid, adipic acid, terephthalic acid, 1,4-cyclohexanedicarboxylic acid, pyromellitic acid, 1,18-dicarboxyoctadecane, and trimer acid which is the trimer of a polyunsaturated $C_{18}$ monocarboxylic acid, being a $C_{54}$ tricarboxylic acid of uncertain structure. The preferred polycarboxylic acid is a dimer acid produced by the dimerization of a polyunsaturated $C_{18}$ monocarboxylic fatty acid to produce an unsaturated $C_{36}$ dicarboxylic acid whose exact structure is not known with certainty. Such a dimer acid is produced by Emery Industries, Inc. under the trade name of Empol 1014.

The amine which is condensed with the polycarboxylic acid to form the polyamide is selected from the group consisting of monoamines and polyamines, preferably diamines, having the general formulas

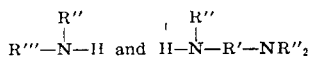

wherein R' is a hydrocarbylene group of about two to about 12 carbons and preferably about two to about six carbons, R'' is selected from the group consisting of hydrogen and hydrocarbyl groups of about one to about 30 carbons and preferably about three to about 24 carbons, and R''' is a hydrocarbyl group of about two to about 12 carbons and preferably about two to about six carbons. R', R''', and R'' when it is a hydrocarbyl group, may be aliphatic, aromatic or naphthenic or they may contain various mixtures of aliphatic, naphthenic and aromatic segments. Aliphatic and naphthenic segments may be either saturated or unsaturated. Examples of suitable monoamines are diethylamine, dodecylamine, cyclohexylamine, methylbutylamine and propylamine. Examples of suitable diamines are ethylenediamine, propylenediamine; 1,12-diaminododecane; hexamethylenediamine; N-methyl-N'-propyl-1,3-propylenediamine; N,N-dibutylethylenediamine; 1,4-diaminohexane; N-oleyl-1,3-propylenediamine; and N-cyclohexylethylenediamine. The preferred amine is N-(10-phenylstearyl)-1,3-propylenediamine.

Examples of carboxylic acids which are useful for salt formation are formic acid, acetic acid, benzoic acid, hexahydrobenzoic acid, dimer acid, tartaric acid, citric acid, gluconic acid, oleic acid, salicylic acid, 10-phenylstearic acid, p-methoxybenzoic acid, lactic acid, alpha-butoxyvaleric acid, and adipic acid. The preferred acid is 10-(hydroxyphenyl) stearic acid.

In order that the additive of our invention have the necessary solubility in hydrocarbon fuels, it is necessary that the polyamide containing from two to about 6 amide groups and at least one amino group contain about 24 to about 100, and preferably about 30 to about 90, carbons. Since the preferred acid for amide formation is dimer acid, the preferred amine is N-(10-phenylstearyl)-1,3-propylenediamine, and the preferred acid for salt formation is 10-(hydroxyphenyl) stearic acid, the preferred additive of our invention is the 10-(hydroxyphenyl)stearic acid salt of the diamide obtained by condensing one mole of dimer acid with two moles of N-(10-phenylstearyl)-1,3-propylenediamine. It will be understood that when the dimer acid condenses with the diamine to form the diamino-diamide, either amino group may condense with a carboxyl group and the product is therefore largely a mixture of the following isomers

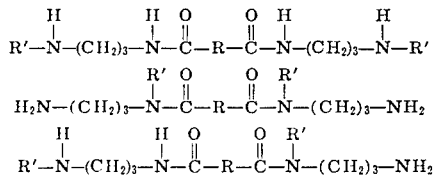

wherein R is the $C_{34}$ hydrocarbylene portion of the dimer acid and R' is a 10-phenylstearyl group. The ratio of 10-(hydroxyphenyl)stearic acid to the diaminodiamide to form our preferred additive is such as to convert from about 10 percent to about 100 percent, and preferably about 50 percent to about 90 percent, of the amino groups of the diamino-diamide to the 10-(hydroxyphenyl)stearic acid salt.

While the concentrations of the additives of this invention in hydrocarbon fuels may be varied over a broad range, hydrocarbon fuel compositions containing from about 1 to about 100 pounds of additive per thousand barrels (PTB) of the composition are generally used. However, hydrocarbon fuel compositions containing from about 4 to about 50 PTB of additive are preferred.

The efficacy of our additives in hydrocarbon fuel compositions is determined by subjecting the compositions to one or more of the following tests. The tests and their procedures are as follows

CARBURETOR DETERGENCY TEST

Engine blow-by contaminants are generated in an engine and collected in a flask. At the end of the collection period the water phase is separated from the fuel phase, the latter being discarded. The water phase of the contaminants is used for the carburetor detergency evaluations.

The carburetor detergency test is run on a Cooperative Lubricants Research (CLR) engine, a single cylinder research engine manufactured by Laboratory Equipment Company. The contaminants are injected into the throttle body of a CLR engine running with a rich mixture and on which the throttle plate has been removed and a 200 mesh stainless steel screen installed near the entrance to the intake manifold. The amount of deposits accumulated on the screen after three hours of engine operation indicates the detergency performance of the fuel. Experimental fuels, with reference and base fuel runs, are tested with the same batch of contaminants.

At the conclusion of the 3 hour run, the 200 mesh screen is removed and evaluated for contaminant accumulation. The reflectance of the screen, determined by means of a reflectance meter, is a measure of the amount of deposits accumulated on the screen. The higher the reflectance, the cleaner the screen, i.e., the lower the accumulation of deposits.

The effectiveness of an additive is represented as the ratio, expressed as a percentage, of the average screen reflectance for the fuel containing the additive to the average screen reflectance for a base fuel containing no detergency additive. Thus an experimental additive that equals the performance of the base fuel will have an effectiveness of 100 percent, an experimental additive that performs at a lower level than the base fuel will have an effectiveness of less than 100 percent, and an experimental additive that performs at a higher level than the base fuel will have an effectiveness of greater than 100 percent.

CARBURETOR ANTI-ICING TEST

The test is run on a CLR single cylinder engine coupled to a speed control dynamometer. The engine is fitted with a special, thermally isolated carburetor with external float bowls; no idle fuel system is used. The carburetor has an adjustable main jet and the throttle body is constructed of glass or clear plastic so icing can be confirmed by visual inspection. A temperature and humidity control system supplies inlet air to the carburetor at the desired conditions and also to a glass or clear plastic box enclosing the carburetor.

The anti-icing additives are evaluated in a base fuel comprising gasoline containing 3 ml./gallon of tetraethyllead. A non-icing purge fuel consisting of the base fuel containing 5.5 percent of isopropyl alcohol is used in the test. The anti-icing properties of gasoline compositions containing additives of this invention are compared to those of the base fuel containing no anti-icing additive.

Ice formation on the throttle plate of the carburetor is measured by an increase of manifold vacuum caused by a choking of the engine by the ice formation. The time in seconds for the manifold vacuum to increase 1.5 and 2.0 inches of mercury are recorded as time to ice with the fuel which is being evaluated. An increase in manifold vacuum of 1.5 inches of mercury is defined as trace ice and an increase in manifold vacuum of 2.0 inches of mercury is defined as severe ice.

Engine operating conditions are set so as to cause a reference fuel, i.e., a base fuel containing a reference anti-icing additive, to ice sufficiently to cause a 2.0 inch manifold vacuum increase in 40 to 50 seconds. When these conditions are set, the base fuel containing no anti-icing additive will ice to the same extent in 18 to 20 seconds. Once these operating conditions have been achieved, the anti-icing characteristics of base fuel containing the experimental additives can be evaluated.

In running the test on a fuel composition containing an experimental additive, once ice severe enough to raise the manifold vacuum 2.0 inches of mercury has formed, the carburetor is switched to the purge fuel which removes the ice. After 50 seconds to allow for ice removal and engine stabilization, the carburetor is switched back to the experimental fuel. The above procedure is repeated until five runs on the experimental fuel have been made, the times for manifold vacuum increases of 1.5 and 2.0 inches of mercury being noted. The times of the five runs are then averaged for each manifold vacuum increase. Either a base fuel or a reference fuel is run after every two experimental additive runs.

WATER TOLERANCE TEST

Into an 8 oz. bottle are poured 100 ml. of the fuel composition to be tested plus 20 ml. of distilled water. The bottle is capped and hand-shaken with an up-down motion for 2.5 minutes, approximately 180 to 200 times. The mixture is stored in the dark on a vibration-free table for 24 hours and is then rated. The interface is rated numerically according to accumulations of skin, dirt, bubbles and emulsion and the numbers range from 0 to 7. A rating of 0 denotes a clean break at the interface with no accumulations of any kind. A rating of 7 denotes that the water phase is occupied completely by emulsion. Various degrees of accumulations at the interface are thus assigned numerical values ranging from 0 for no accumulation to 7 for the poorest rating. Finer variations in the ratings may be denoted by + and − signs after the numerical rating. Thus a rating of 2− is slightly better than a rating of 2 while a rating of 5+ is slightly poorer than a rating of 5. In addition, both the fuel phase and the water phase are rated for clarity as follows C — very clear, no haze
SH — slightly hazy H — hazy
VH — very hazy
E — emulsion Passing ratings for a fuel composition are an interface rating of 0 to 2 and fuel and water phase clarity ratings of C.

CORROSION TEST

The test is run using 300 ml. of a fuel composition comprising 75 volume percent of ASTM grade isooctane and 25 volume percent of reagent grade toluene in contact with 20 ml. of an aqueous salt solution containing 4 weight percent NaCl. The fuel-salt water mixture is placed in a 400 ml. flask thermostatted at 80° F. and an electrode assembly is inserted through the neck of the flask and immersed in the fuel-water mixture. The electrode assembly consists of a central platinum conductor to which are attached, through an insulator, two strips of 1010 carbon steel in an inverted V fashion. Each steel strip is 2 in. long by one-eighth in. wide by 2 mils thick. The free end of each steel strip is separately connected by an insulated conductor to an external circuit consisting of a millivoltmeter, a 1.5 volt DC power source, and the common central electrode. This system permits millivolt readings to be obtained in duplicate, one for each strip, at any given time.

The percent corrosion is determined as follows. The fuel-salt water mixture, thermostatted at 80° F., is stirred and the millivolts at the start are determined for each strip and the two results are averaged ($C°_{avg.}$). At time $t$ the average millivolts ($C_{avg.}$) are again determined. The cumulative value ($C_{cum.}$) at time $t$ is defined by $$C_{cum.} = C°_{avg.}/C_{avg.}$$

The percent corrosion is determined from the expression cl percent Corrosion = $(1-C_{cum.})100$.

The percent corrosion may be thus determined for the unmodified base fuel and for fuel compositions containing anti-corrosion additives.

Additional visual indications of corrosion are the formation of a brown rust dispersion in the fuel-salt water mixture and severe pitting of the steel strips.

The following specific examples will serve to better illustrate our invention.

EXAMPLE I

A solution of 1 mole of Empol 1,014 dimer acid in toluene is placed in a flask fitted with a stirrer, a dropping funnel, a Dean-Stark trap and a reflux condenser. To the stirred solution maintained at a temperature of 24°–31°C are added 2 moles of N-(10-phenylstearyl)-1,3-propylenediamine over a two hour period. The stirred mixture is heated under reflux until 36 ml. of water, the theoretical amount for formation of the mixture of isomeric diamino-diamides, are collected in the Dean-Stark trap. The toluene solution contains 34.3 weight percent of the isomeric diamino-diamides.

Various carboxylic acid salts of the above isomeric diamino-diamides are prepared as follows. The desired amount of the carboxylic acid is added to 200 g. of the above toluene solution of diaminodiamides, each 200 g. of solution containing 68.6 g. of diamino-diamides and 103 meq. of amino groups. The mixture is stirred at room temperature followed by removal of toluene by distillation under reduced pressure to yield the carboxylic acid salt of the isomeric diaminodiamides. Table I lists the salt-forming carboxylic acids, the number of milliequivalents of each salt-forming acid available to react with the 103 meq. of amino groups in the isomeric diamino-diamides, the percent of amino groups of the diamino-diamides converted to the carboxylic acid salt, and the letter designation assigned to each additive product.

TABLE I

| Salt-Forming Carboxylic Acid | Meq. of Salt-Forming Carboxylic Acid | Meq. of Isomeric Diamino-Diamides | % Amino Groups Changed to Salt | Additive Product |
|---|---|---|---|---|
| 10-(hydroxyphenyl)stearic acid | 98.8 | 103 | 96 | a |
| Empol 1014 dimer acid | 103 | 103 | 100 | b |
| Empol 1014 dimer acid | 51.6 | 103 | 50 | c |
| oleic acid | 103 | 103 | 100 | d |
| 10-phenylstearic acid | 103 | 103 | 100 | e |
| acetic acid | 103 | 103 | 100 | f |

EXAMPLE II

A number of related gasoline compositions containing the additives of Example I are prepared and subjected to the water tolerance test. As a reference, a base unleaded gasoline containing no additive is also subjected to the test. The concentrations of the additives and the results of the water tolerance tests on the gasoline compositions are given in Table II.

TABLE II

| Additive | Additive Concentration, PTB | Water Tolerance Ratings Gasoline Phase | Water Phase | Interface |
|---|---|---|---|---|
| — | — | C | C | 0 |
| a | 13 | C | C | 0 |
| a | 26 | C | C | 1 |
| b | 13 | C | C | 1– |
| c | 26 | C | C | 1 |
| c | 13 | C | C | 1– |
| d | 13 | C | C | 1 |
| e | 13 | C | C | 1 |
| f | 13 | C | C(pink color) | 2 |

From the data in Table II it can be seen that unleaded gasoline compositions containing the carboxylic acid salts of the isomeric diamino-diamides of Example I pass the water tolerance test.

EXAMPLE III

Gasoline compositions are prepared by dissolving additives *a* and *f* of Example I in a base gasoline containing 3 ml. TEL/gal. and the compositions are subjected to the carburetor detergency test. For comparison purposes, a base leaded gasoline containing no additive other than 3 ml. TEL/gal. and a leaded (3 ml. TEL/gal.) gasoline composition containing a commercially available multi-functional additive, i.e., DMA-4 manufactured by DuPont Corporation, are also subjected to the carburetor detergency test. The make-up of the gasoline compositions and the results of the tests are given in Table III. It will be noted that the reflectance of 6.4 reflectance units for the 200 mesh screen from the test on the base leaded gasoline is arbitrarily assigned an Effectiveness of 100%.

TABLE III

| Additive | Additive Concentration PTB | Reflectance | % Effectiveness |
|---|---|---|---|
| — | — | 6.4 units | 100.0 |
| DMA-4 | 15 | 25.7 | 401.6 |
| a | 6 | 30.9 | 482.8 |
| f | 6 | 31.5 | 492.2 |

It is seen from Table III that the additives of this invention have excellent carburetor detergency properties.

EXAMPLE IV

Gasoline compositions are prepared by dissolving additives a and f of Example I in a base gasoline containing 3 ml. TEL/gal. and the compositions are subjected to the carburetor anti-icing test. For comparison, a base leaded gasoline containing no additive other than 3 ml. TEL/gal. and a leaded (3 ml. TEL/gal.) gasoline composition containing the commercial multi-functional additive DMA-4 are also subjected to the carburetor anti-icing test. The make-up of the gasoline compositions and the results of the tests are given in Table IV.

TABLE IV

| Additive | Additive Concentration PTB | Average Seconds to Ice Manifold Vacuum Increase, 1.5 in. | Manifold Vacuum Increase 2.0 in. |
|---|---|---|---|
| — | — | 16.49 | 19.57 |
| DMA-4 | 15 | 22.23 | 42.73 |
| a | 6 | 21.23 | 37.14 |
| f | 6 | 19.78 | 33.94 |

From Table IV it can be seen that the additives of this invention, when incorporated in a base leaded gasoline, markedly improve the carburetor anti-icing properties thereof and compare favorably with a commercially available additive.

EXAMPLE V

By the procedure of Example I, various polycarboxylic acids may be condensed with various diamines so that each carboxyl group of the acid condenses with 1 amino group of the diamine to form the N-substituted polyamide wherein each of the substituent groups contains the unreacted amino group. The reaction is represented as follows

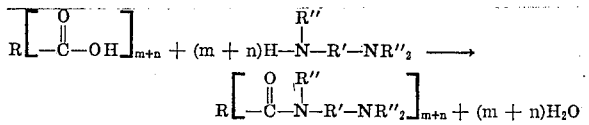

wherein R, R', R'', m, and n are as defined previously. Each of the polyamino-polyamides can be reacted according to the procedure of Example I with a carboxylic acid so that at least 10 percent of the amino groups in the polyaminopolyamides are converted to the carboxylic acid salt. Table V lists the various amide-

TABLE V

| Polycarboxylic acid | Diamine | Salt-forming carboxylic acid | Percent amino groups converted to salt | Additive product |
|---|---|---|---|---|
| Succinic acid | N-oleyl-1,3-propylenediamine | p-Methoxybenzoic acid | 30 | g |
| Adipic acid | 1,12-diaminododecane | Formic acid | 60 | h |
| Terephthalic acid | N-cyclohexyl-ethylenediamine | Adipic acid | 80 | i |
| Trimer acid | Ethylenediamine | Benzoic acid | 40 | j |
| Pyromellitic acid | 1,4-diaminohexane | Lactic acid | 10 | k |
| 1,18-dicarboxyoctadecane | Hexamethylenediamine | Citric acid | 70 | l |
| Glutaric acid | N,N-dibutyl-ethylenediamine | Tartaric acid | 85 | m |
| 1,4-cyclohexane-dicarboxylic acid | N-(10-phenylstearyl)-1,3-propylenediamine | Alpha-butoxyvaleric acid | 90 | n |
| Empol® 1014 dimer acid | Propylenediamine | Hexahydrobenzoic acid | 75 | o | forming polycarboxylic acids, the diamines, the salt-forming carboxylic acids, the percent of the amino groups of the polyamino-polyamides converted to the carboxylic acid salts, and the letter designation assigned to each additive product.

EXAMPLE VI

Diamides may be prepared by condensing 1 mole of a dicarboxylic acid with 1 mole of a monoamine whereby 1 carboxyl group is converted to the amide and the other remains unchanged. This intermediate product may then be reacted with 1 mole of a diamine whereby the remaining carboxyl group is condensed with 1 amino group of the diamine to yield a diamide having an amino group. The reaction is represented as follows

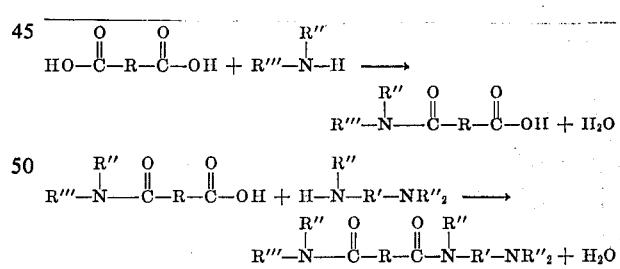

wherein R, R', R'' and R''' are as defined previously. Each of the amino-diamides so formed can be reacted according to the procedure of Example I with a carboxylic acid so that at least 10 percent of the amino groups in the aminodiamide are converted to the carboxylic acid salt. Table VI lists the amide-forming dicarboxylic acids, the monoamines, the diamines, the salt-forming carboxylic acids, the percent of the amino groups of the amino-diamides converted to the carboxylic acid salts, and the letter designation assigned to each additive product.

TABLE VI

| Dicarboxylic acid | Monoamine | Diamine | Salt-forming carboxylic acid | Percent amino groups converted to salt | Additive product |
|---|---|---|---|---|---|
| Empol® 1014 dimer acid | Diethylamine | Ethylenediamine | Formic acid | 75 | p |
| 1,18-dicarboxyoctadecane | Methylbutyl amine | N-methyl-N'-propyl-1,3-propylenediamine | 10-(hydroxyphenyl) stearic acid | 90 | q |
| Terephthalic acid | Cyclohexylamine | N-oleyl-1,3-propylenediamine | Gluconic acid | 10 | r |
| 1,4-cyclohexane-dicarboxylic acid | Propylamine | N-(10-phenylstearyl)-1,3-propylenediamine | p-Methoxybenzoic acid | 50 | s |
| Adipic acid | Dodecylamine | N-oleyl-1,3-propylenediamine | Empol® 1014 dimer acid | 100 | t |

EXAMPLE VII

Leaded (3 ml. TEL/gal.) gasoline compositions containing the additives of this invention can be prepared by dissolving the additives in the base leaded gasoline. Suitable compositions may, for example, contain 4 PTB of additive d; 36 PTB of additive l; 1 PTB of additive f; 15 PTB of additive g; 50 PTB of additive r; 43 PTB of additive j; 8 PTB of additive m; 16 PTB of additive p; 3 PTB of additive k; 11 PTB of additive s; or 20 PTB of additive i. The gasoline compositions containing these additives will have acceptable water tolerance and excellent anti-corrosion properties. In addition, these compositions will be found to have better carburetor detergency and carburetor anti-icing properties than does the base leaded gasoline.

EXAMPLE VIII

Suitable unleaded gasoline compositions may be prepared by dissolving the additives of our invention in a base unleaded gasoline. The compositions may contain, for instance, 14 PTB of additive a; 5 PTB of additive q; 30 PTB of additive h; 1 PTB of additive t; 9 PTB of additive e; 47 PTB of additive n; 15 PTB of additive c; 7 PTB of additive o; 36 PTB of additive s; 11 PTB of additive l; or 40 PTB of additive k. The compositions containing the additives will be found to have superior carburetor anti-icing and carburetor detergency properties relative to the base gasoline and, in addition, pass the water tolerance test. The gasoline compositions will also have superior anti-corrosion properties.

EXAMPLE IX

Diesel fuel compositions containing the additives of this invention may be prepared. Suitable compositions contain 10 PTB of additive a; 48 PTB of additive b; 18 PTB of additive c; 4 PTB of additive d; 2 PTB of additive e; 37 PTB of additive f; 15 PTB of additive k; 7 PTB of additive g; 12 PTB of additive i; 30 PTB of additive l; 17 PTB of additive n; 9 PTB of additive q; 40 PTB of additive s; or 13 PTB of additive p. These diesel fuel compositions will have good anti-corrosion properties and acceptable water tolerance. In addition, the fuel intake systems of diesel engines run on the above fuel compositions will be found to be cleaner than the fuel intake systems of engines run on the base fuel containing no additive.

EXAMPLE X

Jet fuel compositions may be prepared by dissolving the additives of our invention in a base jet fuel. The compositions may, for instance, contain 20 PTB of additive a; 3 PTB of additive d; 7 PTB of additive f; 49 PTB of additive g; 17 PTB of additive h; 38 PTB of additive j; 6 PTB of additive m; 11 PTB of additive o; 14 PTB of additive q; 9 PTB of additive r; or 27 PTB of additive t. The jet fuel compositions will have very good anti-corrosion properties and pass the water tolerance test. Accordingly, jet fuel compositions containing the additives of this invention will not tend to pick up water, resulting in reduced tendency toward ice formation and fuel filter plugging.

EXAMPLE XI

Compositions are prepared by dissolving additives a and f of Example I in a base fuel comprising 75 volume percent of ASTM grade isooctane and 25 volume percent of reagent grade toluene, and the compositions are subjected to the corrosion test. For reference purpses, a sample of base fuel containing no additive is also subjected to the corrosion test. The test is run for 44 hours. The concentrations of the additives and the percent corrosion after 44 hours for each fuel composition are given in Table VII.

TABLE VII

| Additive | Additive Concentration, PTB | % Corrosion |
|---|---|---|
| — | — | 25.41 |
| a | 4 | 0.70 |
| f | 4 | 3.42 |

It is apparent from the data in Table VII that the carboxylic acid salts of amino-polyamides impart excellent anti-corrosion properties to hydrocarbon fuels when incorporated therein. Additional evidence illustrating the effectiveness of a as an anti-corrosion additive is that there is a complete absence of brown rust in the fuel-salt water mixture at the conclusion of the test, and microscopic examination shows that there is practically no pitting of the steel strips at the end of the 44 hour test.

While the invention has been described above with respect to certain preferred embodiments thereof, it will be understood by those skilled in the art that various changes and modifications may be made without departing from the spirit and scope of the invention.

We claim:

1. A normally liquid hydrocarbon fuel composition comprising a major proportion of a normally liquid hydrocarbon fuel and a fuel improving amount of an additive comprising a carboxylic acid salt prepared by reacting a monocarboxylic acid or a dicarboxylic acid selected from the group consisting of unsubstituted hydrocarbyl carboxylic acids, hydroxycarbyl carboxylic acids and hydrocarbyloxy carboxylic acids with a compound having the formula:

wherein $m$ is at least 1 and the sum of $n$ plus $m$ is from 2 to about 6, R is a multivalent hydrocarbon group of about two to about 52 carbons, R' is a hydrocarbylene group of about two to about 12 carbons, R'' is selected from the group consisting of hydrogen and hydrocarbyl groups of about one to about 30 carbons, R''' is a hydrocarbyl group of about two to about 12 carbons, and wherein at least about 10 percent of the amino groups contained therein are converted to the carboxylic acid salt.

2. The normally liquid hydrocarbon fuel composition of claim 1 wherein the normally liquid hydrocarbon fuel is selected from the group consisting of gasoline, diesel fuel, and jet fuel.

3. The normally liquid hydrocarbon fuel composition of claim 2 wherein said composition contains from about 1 to about 100 PTB of the additive of claim 1.

4. A normally liquid hydrocarbon fuel composition selected from the group consisting of gasoline, diesel fuel, and jet fuel compositions containing from about 4 to about 50 PTB of the additive of claim 1 wherein R is a multivalent hydrocarbon group of about four to about 34 carbons, R' is a hydrocarbylene group of about two to about six carbons, R'' is selected from the group consisting of hydrogen and hydrocarbyl groups of about three to about 24 carbons, R''' is a hydrocarbyl group of about two to about six carbons, $n$ is zero, $m$ is 2, and about 50 percent to about 90 percent of the amino groups contained therein are converted to the carboxylic acid salt.

5. A gasoline composition comprising gasoline and about 4 to about 50 PTB of an additive comprising a carboxylic acid salt prepared by reacting 10-(hydroxyphenyl) stearic acid with a compound selected from the group consisting of

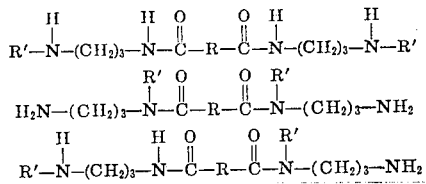

and mixtures thereof wherein R is the $C_{34}$ hydrocarbylene portion of the dimer of a polyunsaturated $C_{18}$ monocarboxylic fatty acid, R' is 10-phenylstearyl, and wherein about 50% to about 90% of the amino groups are converted to the 10-(hydroxyphenyl) stearic acid salt.

* * * * *